(12) United States Patent
Shimizu et al.

(10) Patent No.: US 10,698,353 B2
(45) Date of Patent: Jun. 30, 2020

(54) IMAGE FORMING APPARATUS

(71) Applicant: CANON KABUSHIKI KAISHA, Tokyo (JP)

(72) Inventors: Kazumichi Shimizu, Nagareyama (JP); Nobuyuki Kobayashi, Kawasaki (JP); Takuya Hayato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/647,501

(22) Filed: Jul. 12, 2017

(65) Prior Publication Data
US 2018/0024486 A1 Jan. 25, 2018

(30) Foreign Application Priority Data
Jul. 19, 2016 (JP) .................................. 2016-141516

(51) Int. Cl.
*G03G 15/08* (2006.01)
*G03G 15/00* (2006.01)
(Continued)

(52) U.S. Cl.
CPC ..... *G03G 15/5037* (2013.01); *G03G 15/0855* (2013.01); *G03G 15/55* (2013.01);
(Continued)

(58) Field of Classification Search
CPC ............. G03G 15/556; G03G 15/0856; G03G 15/0831; G03G 15/086; G03G 15/553
(Continued)

(56) References Cited

U.S. PATENT DOCUMENTS 8,050,576 B2 * 11/2011 Yasukawa ............ G03G 15/556
399/262
8,571,426 B2 10/2013 Kubota et al.
(Continued)

FOREIGN PATENT DOCUMENTS

JP 2001-228698 A 8/2001
JP 2004-226933 A 8/2004

OTHER PUBLICATIONS

Translation of Kawai (JP 2012-247551 A) listed in the IDS, publication date: Dec. 13, 2012.*
(Continued)

*Primary Examiner* — Walter L Lindsay, Jr.
*Assistant Examiner* — Frederick Wenderoth
(74) *Attorney, Agent, or Firm* — Venable LLP

(57) ABSTRACT

An image forming apparatus includes an image bearing member, a developing unit to develop an electrostatic latent image formed on the image bearing member with toner, and a detachable toner container in which toner for supplying to the developing unit is contained. A measuring unit measures information relating to an amount of toner in the developing unit, and a determination unit determines an amount of toner in the developing unit based on the measured information. In a case where the determination unit determines that the toner container is empty, a supply operation for supplying toner from the toner container to the developing unit is performed and the measuring unit measures the information relating to an amount of toner in the toner container after the supply operation is performed, and in a case where the information relating to an amount of toner in the toner container measured after the supply operation is performed is within a measurement error range, the determination unit determines that the toner container is empty.

15 Claims, 7 Drawing Sheets

(51) Int. Cl.
*H04N 1/21* (2006.01)
*G03G 21/18* (2006.01)
*G06K 15/00* (2006.01)
*G06K 15/12* (2006.01)
*H04N 1/32* (2006.01)

(52) U.S. Cl.
CPC ..... *G03G 21/1878* (2013.01); *G06K 15/4075* (2013.01); *H04N 1/2129* (2013.01); *G06K 15/1238* (2013.01); *H04N 1/32448* (2013.01)

(58) Field of Classification Search
USPC .......................................................... 399/27
See application file for complete search history.

(56) References Cited

U.S. PATENT DOCUMENTS

| | | |
|---|---|---|
| 8,977,152 B2 | 3/2015 | Shimizu |
| 2003/0123888 A1* | 7/2003 | Naito ................. G03G 15/0856 399/27 |
| 2008/0226318 A1* | 9/2008 | Ogiwara ............ G03G 15/0126 399/53 |
| 2012/0243886 A1* | 9/2012 | Sunayama ......... G03G 15/0856 399/27 |
| 2013/0223856 A1* | 8/2013 | Koyama ............ G03G 15/0862 399/27 |
| 2015/0003846 A1* | 1/2015 | Yang .................... G03G 15/556 399/27 |

OTHER PUBLICATIONS

Translation of An (KR 2006-085028 A) listed in the IDS, publication date: Jul. 26, 2006.*

* cited by examiner

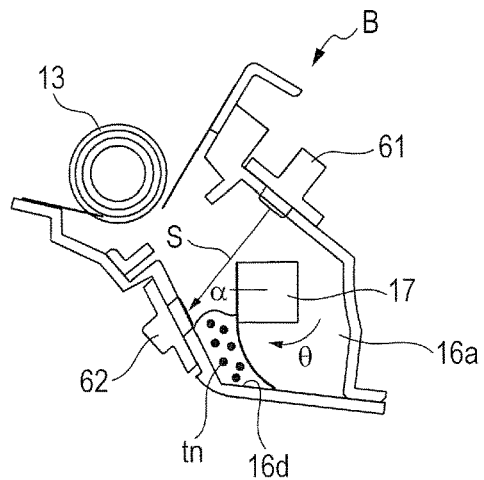
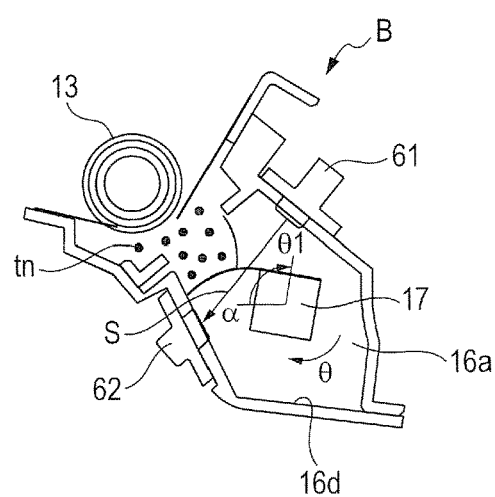
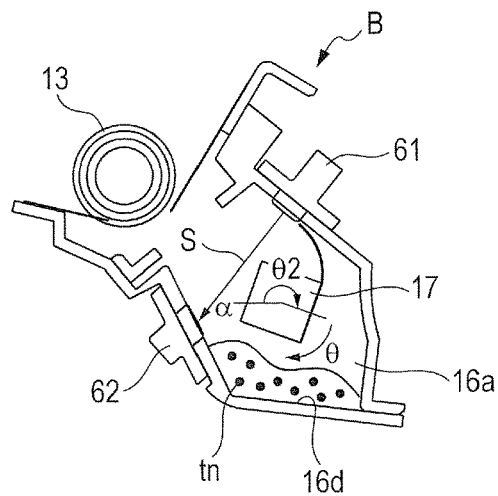

IMAGE FORMING APPARATUS

BACKGROUND OF THE INVENTION

Field of the Invention

The present invention relates to an image forming apparatus that, with respect to a cartridge used in an image forming apparatus such as an electrophotographic printer or a copier, includes a toner supplying mechanism and has a detection unit for detecting a toner remaining amount in a cartridge.

Description of the Related Art

In image forming apparatuses such as electrophotographic copiers or printers, if the image forming apparatus is equipped with a cartridge having a supplying mechanism for toner, detection of the remaining amount of toner is performed after a toner supplying operation as an initial operation in accordance with the remaining amount of toner or the usage situation of members constituting the cartridge. As a method for detecting the remaining amount of toner (hereunder, referred to as "toner remaining amount"), a method is available that detects a light amount that passes through the inside of a cartridge using an optical semiconductor device. Another method for detecting a toner remaining amount that has been proposed is a method that detects the electrostatic capacitance of toner that is formed between a developing roller and an antenna electrode (for example, see Japanese Patent Application Laid-Open No. 2001-228698). According to this method, the electrostatic capacitance of the toner is detected by providing an antenna electrode facing a developing roller that is a developer bearing member and applying an alternating voltage to the developing roller. With respect to this kind of method for detecting the toner remaining amount, in order to reduce detection errors that arise due to a variety of factors when performing calculation of the toner remaining amount, a method has been proposed that calculates an optimal value using a mean value, a maximum value and a minimum value of output values that are sampled during a certain time period (for example, see Japanese Patent Application Laid-Open No. 2004-226933).

However, an error component arises irrespective of which kind of calculation method is adopted. For example, in a case where the toner remaining amount in a process cartridge has decreased, in some cases, even if there is no remaining amount of toner in a toner bottle, an error occurs in a detection operation for detecting the toner remaining amount at the time of an initial operation, and the toner remaining amount that is detected increases to an amount that is more than the actual toner remaining amount.

SUMMARY OF THE INVENTION

An object of the present invention is to enable accurate measurement of the remaining amount of toner also in the case of measuring a toner remaining amount at the time of an initial operation.

According to the present invention, there is provided, an image forming apparatus including an image bearing member, a developing unit configured to develop an electrostatic latent image formed on the image bearing member, with toner, a cartridge having the developing unit, the cartridge detachably provided in a main body of the image forming apparatus, a toner container in which toner for supplying to the developing unit is contained, the toner container detachably provided in the main body, a memory unit configured to store information relating to a usage state of the cartridge, a measuring unit configured to measure an amount of toner in the developing unit, and a determination unit configured to determine an amount of toner in the developing unit based on information stored in the memory unit, information obtained by measurement by the measuring unit, and a measurement error of the measuring unit, at a time of an initial operation before performing an image forming operation.

Further features of the present invention will become apparent from the following description of exemplary embodiments with reference to the attached drawings.

BRIEF DESCRIPTION OF THE DRAWINGS

FIGS. 3A, 3B and 3C are explanatory drawings for describing movement of toner and a measurement operation to measure a toner remaining amount according to Embodiment 1.

DESCRIPTION OF THE EMBODIMENTS

Hereunder, modes for implementing the present invention are described in detail by way of embodiments while referring to the accompanying drawings.

[Embodiment 1]

A developer container, a developing apparatus, a process cartridge and an image forming apparatus of Embodiment 1 will now be described. The image forming apparatus forms an image on a recording medium using an electrophotographic image forming process. The term "image forming apparatus" includes, for example, an electrophotographic copier, an electrophotographic printer (a laser beam printer, an LED printer or the like) and a facsimile. The term "cartridge" refers to a component obtained when at least one of a photosensitive drum as an image bearing member and a process unit that acts on the photosensitive drum are formed into a cartridge which is configured to be detachably mountable to the main body of an image forming apparatus. The cartridge types include a type in which a photosensitive drum and a developer bearing member (hereunder referred to as "developing roller") are formed into a cartridge in a unified manner, and a type in which a photosensitive drum and a developing roller are formed into cartridges separately. A cartridge obtained by forming a photosensitive drum and a developing roller into a cartridge in a unified manner is referred to as a "process cartridge". Further, among the cartridges obtained by forming a photosensitive drum and a developing roller into cartridges separately, a cartridge obtained by forming the photosensitive drum into a cartridge is referred to as a "drum cartridge". Furthermore, among the cartridges obtained by forming a photosensitive drum and a developing roller into cartridges separately, a cartridge obtained by forming the developing roller into a cartridge is referred to as a "developing cartridge" (developing apparatus). In addition, in many cases a developing cartridge has a developer container that stores developer.

The present embodiment is described taking the aforementioned process cartridge that is detachably mountable to the main body of an image forming apparatus as an example. The process cartridge is broadly divided into a drum unit having a photosensitive drum, and a developing unit having a developing roller, and the respective units are integrated to form the cartridge.

(1) Overall Description of Image Forming Apparatus

Figure 1:
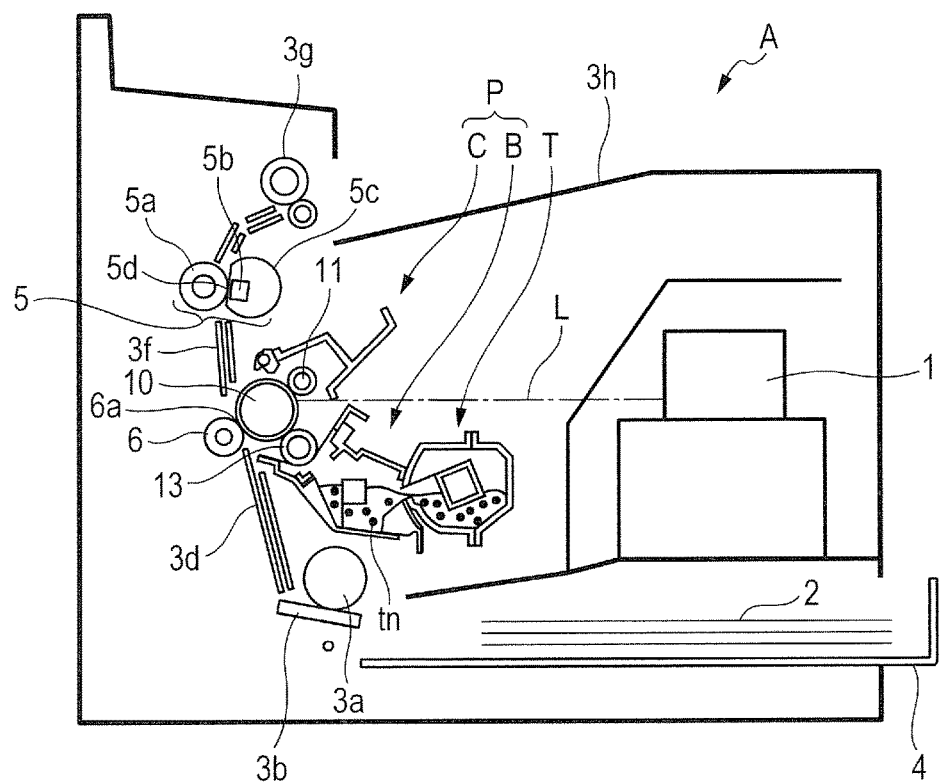
FIG. 1 is a cross-sectional diagram illustrating an image forming apparatus according to Embodiment 1.

The overall configuration of an image forming apparatus A of Embodiment 1 will now be described using FIG. 1. FIG. 1 is a cross-sectional diagram of the image forming apparatus A of Embodiment 1. The main body of the image forming apparatus A is also referred to as "apparatus main body A". The image forming apparatus A receives image information from an external device such as a personal computer. The image forming apparatus A forms an image by means of toner to on a recording medium 2 by an electrophotographic image forming process in accordance with the image information that is received. The recording medium 2 is a recording material such as a paper sheet, and hereunder is referred to as "sheet 2". The image forming apparatus A has a cartridge (hereunder, referred to as "process cartridge") P in which a developing unit B as a developing portion and a drum unit are integrated. The process cartridge P includes at least the developing unit B. The process cartridge P is detachably provided in the apparatus main body A. That is, the process cartridge P can be mounted to the apparatus main body A by a user and can be detached from the apparatus main body A by a user. The image forming apparatus A has a toner bottle T which is a toner container that contains the toner tn for supplying to the developing unit B, and which is detachably provided in the apparatus main body A. The toner bottle T is detachably provided with respect to the developing unit B of the process cartridge P. The toner tn for supplying to the developing unit B is stored in the toner bottle T. Black spots drawn inside the toner bottle T as illustrated in FIG. 1 represent the toner tn. The developing unit B has a developing roller 13. The drum unit C has a photosensitive drum 10 and a charging roller 11.

A voltage from an electric power supply apparatus (not illustrated) included in the apparatus main body A is applied to the charging roller 11. The surface of the photosensitive drum 10 is uniformly charged by the charging roller 11 to which the voltage was applied. A scanning apparatus 1 as an optical unit irradiates a laser beam L (indicated by an alternate long and short dashed line) that is in accordance with the image information onto the charged photosensitive drum 10. By this means, an electrostatic latent image in accordance with the image information is formed on the photosensitive drum 10 (on the image bearing member). The developing unit B as developing means develops the electrostatic latent image formed on the photosensitive drum 10 by means of the toner to to thereby form a toner image (developer image) on the surface of the photosensitive drum 10.

The sheets 2 that are stored in a sheet feeding tray 4 are separated one by one and fed in synchrony with formation of a toner image. At this time, the respective sheets 2 are fed while the conveyance thereof is regulated by a sheet feeding roller 3a and a separation pad 3b that presses against the sheet feeding roller 3a. The sheet 2 is conveyed to a transfer roller 6 as a transfer unit along a conveyance guide 3d. The transfer roller 6 is urged so as to contact against the surface of the photosensitive drum 10. The sheet 2 passes through a transfer nip section 6a that is formed by the photosensitive drum 10 and the transfer roller 6. When the sheet 2 passes through the transfer nip section 6a, a voltage of reverse polarity to the polarity of the toner image is applied to the transfer roller 6. The toner image formed on the surface of the photosensitive drum 10 is transferred onto the sheet 2 by the transfer roller 6. The sheet 2 onto which the unfixed toner image has been transferred is conveyed to a fixing device 5 that is a fixing unit in a state in which the conveyance of the sheet 2 is regulated by a conveyance guide 3f. The fixing device 5 includes a driving roller 5a, and a fixing roller 5c that contains a heater 5b therein. The sheet 2 is heated and pressurized when passing through a nip section 5d formed by the driving roller 5a and the fixing roller 5c. The toner image that was transferred onto the sheet 2 is fixed to the sheet 2 by the fixing device 5. As a result of the above process, an image is formed on the sheet 2. The sheet 2 is conveyed by a pair of discharging rollers 3g and is discharged to a discharge unit 3h.

(2) Description of Electrophotographic Image Forming Process

Figure 2:
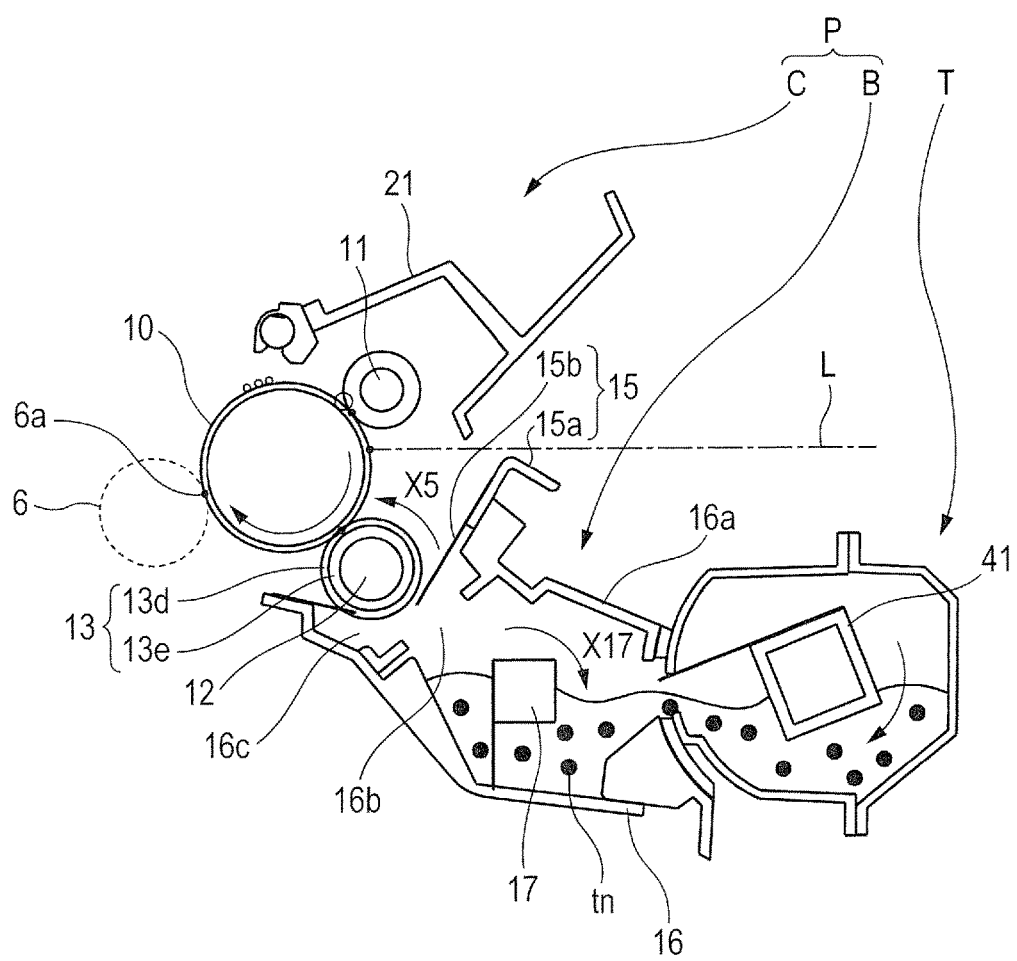
FIG. 2 is a cross-sectional diagram of a process cartridge according to Embodiment 1.

An electrophotographic image forming process of Embodiment 1 will now be described using FIG. 2. FIG. 2 is an explanatory drawing illustrating a cross-section of the process cartridge P. The developing unit B includes a developer container 16 as a developing device frame member, and the developing roller 13 and a developing blade 15 as a developing unit. Further, the drum unit C includes the photosensitive drum 10 and the charging roller 11 within a cleaning device frame member 21.

The developer container 16 includes a developer container unit 16a and a developer conveyance member 17. The developer conveyance member 17 is supported by the developer container 16 so that the developer conveyance member 17 can rotate in a manner that takes the longitudinal direction (direction perpendicular to the page surface) of the developer container 16 as the axis of rotation. The toner to that is stored in the developer container unit 16a is sent into a developing chamber 16c from an opening 16b of the developer container 16 by rotation of the developer conveyance member 17 in the direction of an arrow X17 (clockwise direction in FIG. 2). The developing roller 13 that contains a magnet roller 12 therein is provided in the developer container 16. The developing roller 13 includes a shaft section 13e and a rubber section 13d. The shaft section 13e is an elongated cylindrical shape and is made of aluminum or the like and is electrically conductive. A center section of the shaft section 13e in the longitudinal direction is covered with the rubber section 13d. The rubber section 13d is covered over the shaft section 13e so that the external shape of the rubber section 13d is on a coaxial line with respect to the shaft section 13e. The developing roller 13 draws the toner tn in the developing chamber 16c to the surface of the developing roller 13 by means of the magnetic force of the magnet roller 12. The developing blade 15 includes a support member 15a made of sheet metal, and an elastic member 15b made from urethane rubber or a SUS (stainless steel) plate or the like. The elastic member 15b is provided so as to elastically contact the developing roller 13 with a certain contact pressure. By rotation of the developing roller 13 in a rotation direction X5 (counter-clockwise direction in FIG. 2), the amount of the toner tn adhering to the surface of the developing roller 13 is regulated and a charge that was charged by friction is imparted to the toner tn. A toner layer is formed by the elastic member 15b on the surface of the developing roller 13. A voltage is applied to the developing roller 13 from an electric power supply apparatus (not illustrated) of the apparatus main body A. The developing roller 13 rotates in the rotation direction X5 in a state in which the developing roller 13 contacts the photosensitive drum 10. The toner tn is supplied by the developing roller 13 to the developing region of the photosensitive drum 10.

The charging roller 11 is provided in contact with the outer circumferential face of the photosensitive drum 10. The charging roller 11 is rotatably supported by the cleaning device frame member 21, and is urged in the direction of the photosensitive drum 10. A voltage from the electric power supply apparatus (not illustrated) of the apparatus main body A is applied to the charging roller 11. The surface of the photosensitive drum 10 is uniformly charged by the charging roller 11. The voltage to be applied to the charging roller 11 is set to a value such that a potential difference between the surface of the photosensitive drum 10 and the charging roller 11 becomes equal to or greater than a discharge starting voltage. For example, a direct-current voltage of −1300 V is applied as a charging voltage to the charging roller 11. When the charging voltage is −1300 V, the surface of the photosensitive drum 10 is uniformly charged so that a charging potential (dark area potential) becomes −700 V. When the laser beam L of the scanning apparatus 1 is irradiated onto the photosensitive drum 10, an electrostatic latent image is formed on the surface of the photosensitive drum 10. The toner tn is transferred in accordance with the electrostatic latent image on the photosensitive drum 10 to visualize the electrostatic latent image, thereby forming a toner image on the photosensitive drum 10. In FIG. 2, the transfer roller 6 that forms the transfer nip section 6a with the photosensitive drum 10 is indicated by a broken line.

(3) Description of Configuration of Process Cartridge P

The configuration of the process cartridge P of Embodiment 1 will now be described referring to FIG. 2. The process cartridge P is broadly divided into the developing unit B and the drum unit C. The developing unit B and the drum unit C are coupled with one another by a cover member that protects the process cartridge P at both ends in the longitudinal direction. The developing roller 13 of the developing unit B and the photosensitive drum 10 of the drum unit C are unified into a cartridge so as to be in mutual contact. The toner bottle T is configured to be detachably mountable to the developing unit B.

(4) Description of Configuration of Toner Bottle T

The configuration of the toner bottle T will now be described. The toner bottle T has a toner conveyance member 41 that can rotate to convey toner inside the toner bottle T to the developer container unit 16a. Accompanying rotation of the toner conveyance member 41 of the toner bottle T, the toner to inside the toner bottle T is supplied to the developing unit B. The toner conveyance member 41 rotates in the clockwise direction in FIG. 2. For example, when performing a supplying operation to supply the toner tn, the toner bottle T is connected to the process cartridge P, the connecting portion opens, and the toner tn is supplied from the toner bottle T to the developing unit B (see FIG. 2). When a supplying operation to supply the toner tn is not being performed, the connecting portion closes (see FIGS. 3A to 3C). A different form may also be adopted with respect to the configuration of the process cartridge P and the toner bottle T in relation to the supplying operation to supply the toner tn.

(5) Brief Description of Toner Supplying System

The process cartridge that adopts a toner supplying system according to Embodiment 1 will now be described. The term "toner supplying system" refers to a system in which an operation to mount a new toner bottle T to supply the toner tn into the developing unit B is performed when the amount of the toner tn inside the developing unit B has decreased, and thereafter an operation that consumes the toner tn is repeated. When it is detected that the amount of the toner tn inside the developing unit B has decreased, the user is notified of the fact that the toner tn has decreased, and is prompted to replace the toner bottle T. In Embodiment 1, the user is prompted to replace the toner bottle T when the toner remaining amount has become 0% The user may also be prompted to replace the toner bottle T when the toner remaining amount is slightly more than 0%.

(6) Description of Toner Remaining Amount Detection System of Developing Unit B

The movement of the toner tn inside the developer container unit 16a as well as detection of the remaining amount of toner tn (hereunder, referred to as "remaining amount of toner detection") will now be described referring to FIG. 3A, FIG. 3B and FIG. 3C. FIGS. 3A to 3C are cross-sectional diagrams of the developing unit B. In FIGS. 3A to 3C, states are illustrated in which the toner amount inside the developer container unit 16a is constant and the rotational phases of the developer conveyance member 17 are respectively different. A light emitting element 61 is provided in the developer container unit 16a of the developing unit B. The light emitting element 61 emits light toward the inside of the developer container unit 16a. A light receiving element 62 is provided at a position that faces the light emitting element 61 of the developer container unit 16a. In a case where there is no material that blocks light between the light emitting element 61 and the light receiving element 62, the light emitted from the light emitting element 61 arrives at the light receiving element 62, and the light receiving element 62 receives the light.

FIG. 3A illustrates a state in which the toner tn is not interposed on an optical path S of the light that is used for remaining amount of toner detection. The toner tn that is accumulated at a bottom 16d of the developer container unit 16a is conveyed in the direction of the developing roller 13 by rotation of the developer conveyance member 17 in the direction of an arrow θ. FIG. 3A illustrates a state immediately before the toner tn is conveyed in the direction of the developing roller 13. Taking the state in FIG. 3A as a reference for rotation of the developer conveyance member 17, reference character α is illustrated as a reference for the angle of rotation.

FIG. 3B illustrates a state in which the developer conveyance member 17 has rotated by the amount of an angle from the state illustrated in FIG. 3A. The toner tn inside the developer container unit 16a is being supplied in a direction toward the developing roller 13 by the developer conveyance member 17. In this state, the toner tn and the developer conveyance member 17 are interposed on the optical path S. Therefore, the light emitted from the light emitting element 61 is blocked by the toner tn and the developer conveyance member 17 and does not reach the light receiving element 62.

FIG. 3C illustrates a state in which the developer conveyance member 17 has rotated by the amount of an angle θ2 (θ1<θ2) from the state illustrated in FIG. 3A. This is a state at a timing at which the developer conveyance member 17 has withdrawn from the optical path S. The toner tn drops down to the bottom 16d of the developer container unit 16a under its own weight. Neither of the toner tn nor the developer conveyance member 17 are interposed on the optical path S. Consequently, the light emitted from the light emitting element 61 can reach the light receiving element 62 without being blocked by the toner tn and the developer conveyance member 17. When the developer conveyance member 17 further rotates in the direction of the arrow θ from the state in FIG. 3C, the developer conveyance member 17 enters the state illustrated in FIG. 3A.

In the states illustrated in FIG. 3A and FIG. 3C, light emitted from the light emitting element 61 can reach the light receiving element 62. In the state illustrated in FIG. 3B, light emitted from the light emitting element 61 cannot reach the light receiving element 62. During a period in which the developer conveyance member 17 as an agitation member performs one full rotation, a time period in which the light emitted from the light emitting element 61 can reach the light receiving element 62 and a time period in which the light emitted from the light emitting element 61 cannot reach the light receiving element 62 arise. A time period (interval) in which the light emitted from the light emitting element 61 is received by the light receiving element 62 is referred to hereunder as a "light receiving time period". The light receiving time period changes depending on the remaining amount of the toner tn interposing inside the developer container unit 16a. The shorter the light receiving time period is, the greater the remaining amount of the toner tn in the developer container unit 16a is measured as being by a toner remaining amount detection unit 414 illustrated in FIG. 4 that is described later. The remaining amount of the toner tn inside the developer container unit 16a can be detected by detecting a change in the light receiving time period (interval). The foregoing is a description of a system for detecting the remaining amount of the toner tn. Apart from the above-described method, other methods for detecting the remaining amount of the toner tn include a method that detects a change in the electrostatic capacitance inside the process cartridge P. A different method may also be adopted as the method for detecting the remaining amount of the toner tn inside the process cartridge P.

[Block Diagram of Image Forming Apparatus]

Figure 4:
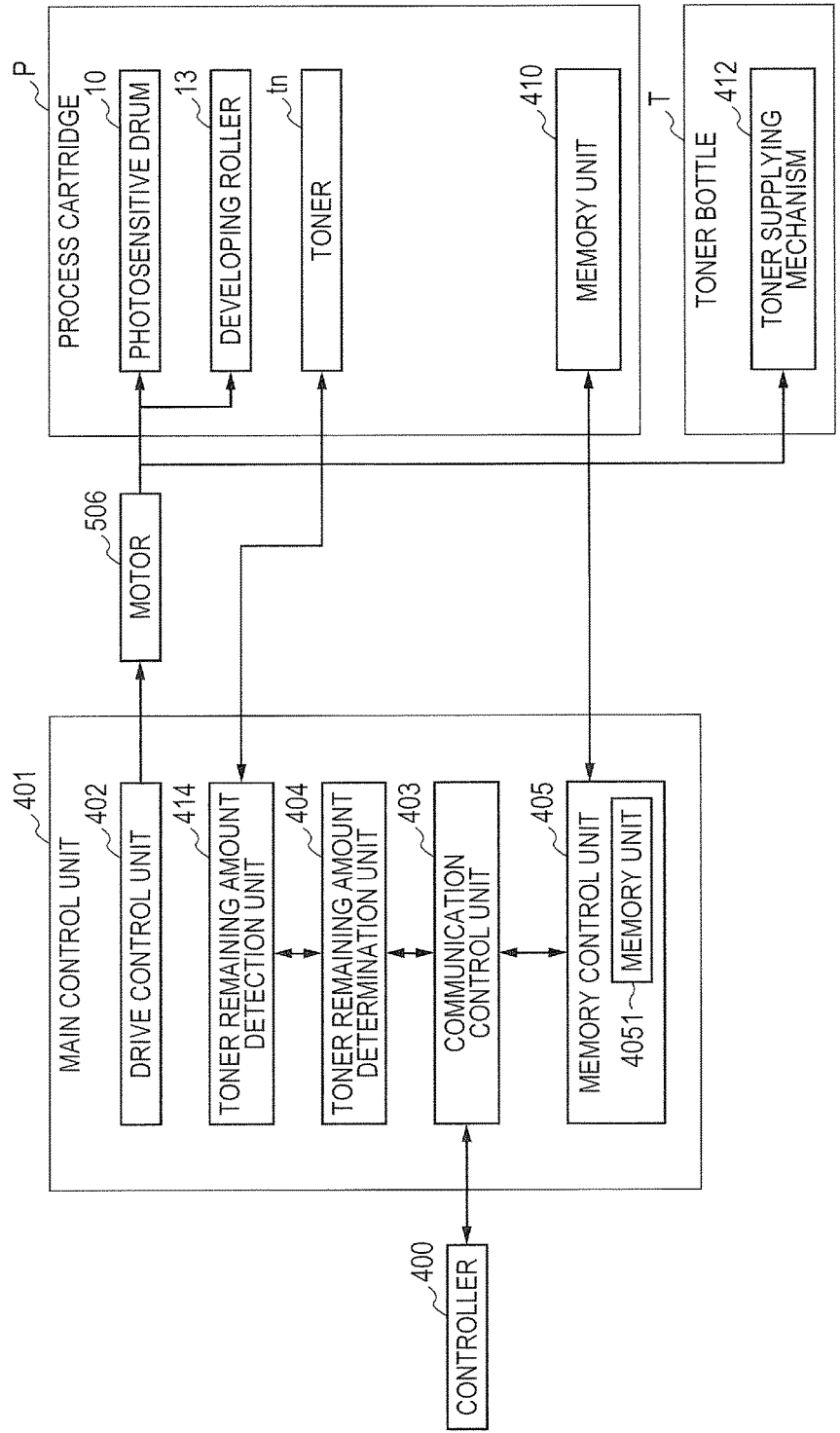
FIG. 4 is a block diagram of an image forming apparatus according to Embodiments 1 and 2.

A block diagram of the image forming apparatus A of Embodiment 1 is illustrated in FIG. 4. A main control unit 401 includes a drive control unit 402, a communication control unit 403, a memory control unit 405, the toner remaining amount detection unit 414 and a toner remaining amount determination unit 404. The memory control unit 405 includes a memory unit 4051, and writes data to the memory unit 4051 and reads out data stored in the memory unit 4051. The memory control unit 405 also writes data to a memory unit 410 of the process cartridge P, and reads out data stored in the memory unit 410. The toner remaining amount detection unit 414 functions as a measuring unit that, during printing and during an initial operation, measures a remaining amount of the toner tn inside the process cartridge P using the light emitting element 61 and the light receiving element 62. The term "initial operation" refers to an initial operation that is performed in advance of an image forming operation. The toner remaining amount determination unit 404 determines a remaining amount of the toner tn inside the process cartridge P based on a toner remaining amount that is measured by the toner remaining amount detection unit 414 and information stored in the memory unit 4051 and the memory unit 410. The toner remaining amount determination unit 404 functions as a determination unit. A method for determining a remaining amount of the toner tn is described in detail later. The process cartridge P has the memory unit 410 which information can be written to, and from which information can be read out. The memory unit 410 stores information regarding the usage state of the process cartridge P. A toner remaining amount that is determined by the toner remaining amount determination unit 404 is stored in the memory unit 410 of the process cartridge P. The drive control unit 402 controls a motor 506 as a driving source, and together with the photosensitive drum 10 and the developing roller 13 of the process cartridge P, the motor 506 drives a toner supplying mechanism 412 provided in the toner bottle T. The communication control unit 403 performs communication with a controller 400 that is provided integrally with the image forming apparatus A. The communication control unit 403 receives information relating to image formation from a host (not illustrated) such as a personal computer via the controller 400, and sends information regarding the state of the image forming apparatus A to the controller 400. The controller 400 uses the host or a display unit (not illustrated) to inform a user of the state of the image forming apparatus A. The memory control unit 405 controls the memory unit 410 of the process cartridge P to write or read out predetermined data. Predetermined data that is stored in the memory unit 410 of the process cartridge P includes information regarding whether or not the process cartridge P is a new process cartridge (hereunder, referred to as "new-cartridge information", and information regarding the photosensitive drum 10 and the developing roller 13 (hereunder, referred to as "service life information"). The information regarding the usage state of the process cartridge P is the new-cartridge information for the process cartridge P or the amount of the toner to in the developing unit B that is determined by the toner remaining amount determination unit 404.

An initial operation is an operation for placing the image forming apparatus A in a state in which image forming can be performed, and is executed when the power of the image forming apparatus A is turned on and when the process cartridge P is replaced and the like. The initial operation includes, for example, driving the respective driving units including the motor 506, the fixing unit and the scanning apparatus 1, and also an operation that drives the process cartridge P and an operation that detects the toner remaining amount of the developing unit B. The toner bottle T has the toner supplying mechanism 412 as a supplying unit. During the initial operation, together with the rollers involved in image formation and also the photosensitive drum 10 and the developing roller 13 inside the process cartridge P being driven by the motor 506, a toner supplying operation is also performed by the toner supplying mechanism 412.

[Toner Supplying Operation and Toner Measurement Operation During Initial Operation]

Figure 5:
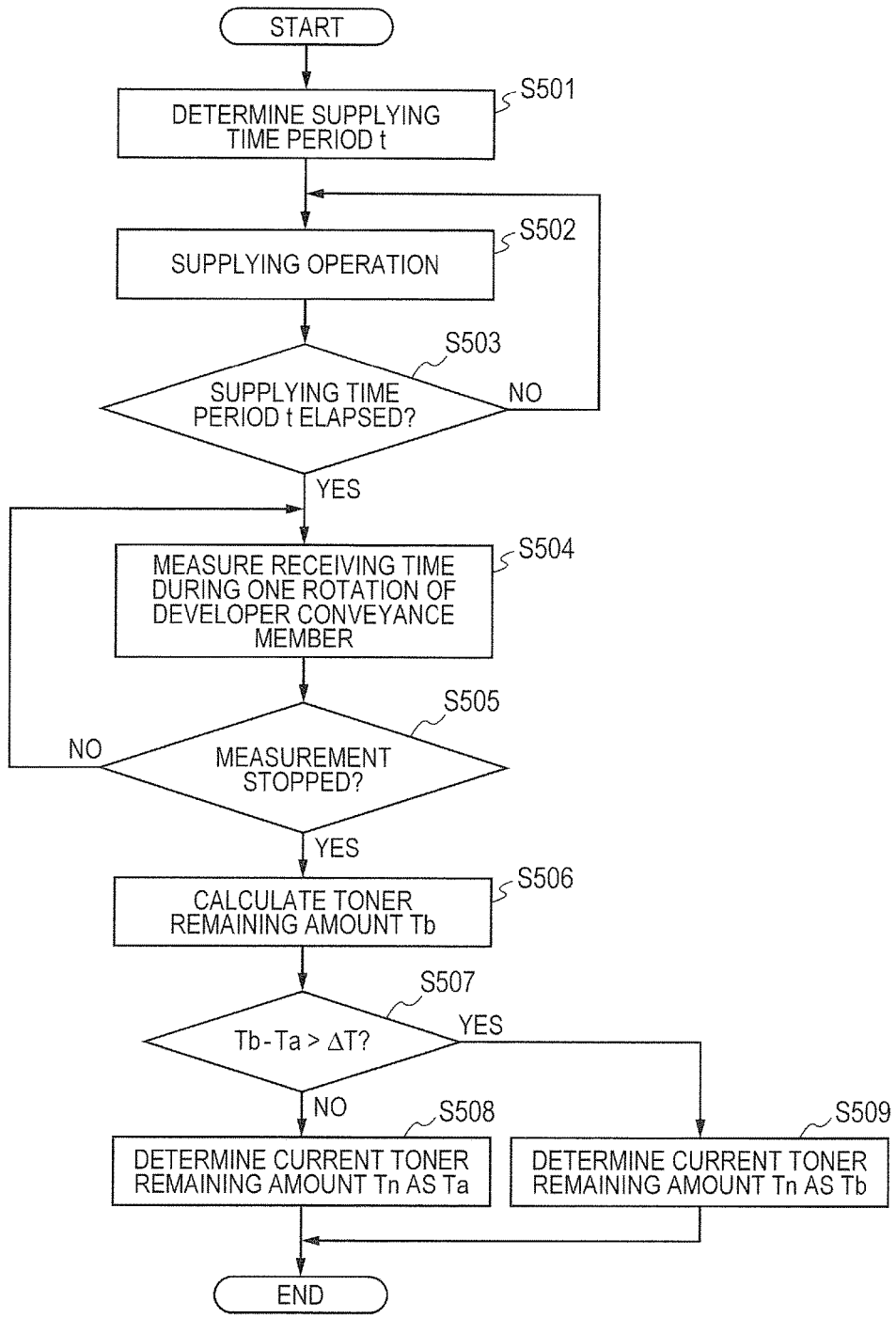
FIG. 5 is a flowchart illustrating a supplying operation and a measurement operation to measure the toner remaining amount according to Embodiment 1.

FIG. 5 is a flowchart illustrating processing for determining the toner remaining amount in the process cartridge P during an initial operation in Embodiment 1. As one example, a supplying operation to supply the toner tn and toner remaining amount detection (a toner tn measurement operation) during an initial operation in a case where the process cartridge P is in an out-of-toner state, described later, are described. The image forming apparatus A of Embodiment 1 does not have a replacement detecting unit that includes a memory unit in which information regarding whether or not the toner bottle T was replaced is stored. The image forming apparatus A also does not have a unit for switching between whether or not to execute a supplying operation to supply the toner tn by means of the toner supplying mechanism 412. However, regardless of whether the image forming apparatus A has or does not have a replacement detecting unit or a unit for switching between whether or not to execute a supplying operation, the toner remaining amount can be determined by the determination processing illustrated in FIG. 5. Data shown in Table 1 to Table 4 that are described later is data that is experimentally determined in advance. The data in Table 1 is stored in the memory unit 410 of the process cartridge P. The data in Table 2 to Table 4 may be stored in either of the memory unit 4051 of the memory control unit 405 and the memory unit 410 of the process cartridge P. The data in Table 1 may also be stored in the memory unit 4051 of the memory control unit 405. In the memory unit 410 of the process cartridge P, separately to a region for storing the information in Table 1, a region is provided for storing information showing the toner remaining amount of the process cartridge P and information indicating whether the process cartridge P is or is not a new cartridge. However, in a case where the process cartridge P is a new cartridge, a value (for example, 2%) that is written at the factory before shipment is stored as the toner remaining amount. Although the value of the toner remaining amount is described as an integer hereunder, the value may be a fraction.

Upon starting the initial operation when a door (not illustrated) of the image forming apparatus A is closed after being opened, the main control unit 401 starts the processing from step (hereunder, referred to as "S") 501 onward that is illustrated in FIG. 5. The developer conveyance member 17 is rotating when the processing from S501 onward is being executed. In S501, because the image forming apparatus A does not have a replacement detecting unit for detecting replacement of the toner bottle T, the main control unit 401 reads out a toner remaining amount Ta of the process cartridge P or new-cartridge information regarding the process cartridge P from the memory unit 410 of the process cartridge P. The main control unit 401 causes an operation to supply the toner tn to be performed for a predetermined time period that is in accordance with the information that was read out. The predetermined time period required for the supplying operation to supply the toner tn is referred to as "supplying time period t". The supplying time period t is determined by the main control unit 401.

An example of the relation between the state of the process cartridge P, the new-cartridge information, the toner remaining amount Ta, the supplying time period t and an assumed supply amount ΔS is shown in Table 1.

ΔS is 90%. The value 2% that is the value of the toner remaining amount Ta in a case where the new-cartridge information in Table 1 indicates that the process cartridge P is new is, as described above, a value that is stored at the factory. When the new-cartridge information indicates that the process cartridge P is not new, the state of the process cartridge P is determined according to the toner remaining amount Ta. The toner remaining amount Ta (%), the supplying time period t (seconds) and the assumed supply amount ΔS (%) are determined depending on the state of the process cartridge P. For example, when the state of the process cartridge P is the "Out of toner" state, the toner remaining amount Ta (%) is 0%, the supplying time period t is 50 seconds and the assumed supply amount ΔS is 80%. Thus, the main control unit 401 determines the supplying time period t based on information that is read out from the memory unit 410 of the process cartridge P and information of Table 1 that is previously stored in the memory unit 410. For example, in a case where the new-cartridge information read out from the memory unit 410 indicates that the process cartridge P is not new and the toner remaining amount Ta is 0%, the main control unit 401 refers to the row for the "Out of toner" state in Table 1 and sets the supplying time period to 50 seconds. Thus, the supplying time period t is determined based on information stored in the memory unit 410 and information in Table 1.

In S502, the main control unit 401 drives the motor 506 to perform a supplying operation to supply the toner to by means of the toner supplying mechanism 412 for the supplying time period t (for example, 50 seconds) determined in S501. The main control unit 401 resets and starts a timer (not illustrated) to measure the supplying time period t. In S503, the main control unit 401 refers to the timer to determine whether or not the supplying time period t (for example, 50 seconds) has elapsed. In S503, if the main control unit 401 determines that the supplying time period t has not elapsed, the main control unit 401 returns the processing to S502. In S503, if the main control unit 401 determines that the supplying time period t has elapsed, the main control unit 401 ends the supplying operation and stops the timer, and

TABLE 1

| Process Cartridge State | New-cartridge Information | Toner Remaining Amount Ta (%) | Supplying Time Period t (secs) | Assumed supply amount ΔS (%) |
|---|---|---|---|---|
| New Cartridge | New Cartridge | 2 | 60 | 90 |
| Out Of Toner | Not New Cartridge | 0 | 50 | 80 |
| Toner Low | Not New Cartridge | 1-10 | 40 | 50 |
| Other Than Above | Not New Cartridge | 11-100 | 0 | 4 |

The first column in Table 1 shows states of the process cartridge P. As one example, a "New cartridge" state, an "Out of toner" state, a "Toner low" state, and an "Other" state (described as "Other than above" in the table) are shown as states of the process cartridge P. The second column in Table 1 shows new-cartridge information, and shows whether the process cartridge P is a new cartridge or is not a new cartridge. The third column in Table 1 shows the toner remaining amount Ta (%), in which the toner remaining amount is shown as a value between 0% and 100%. The fourth column in Table 1 shows the supplying time period t (seconds). The fifth column in Table 1 shows the assumed supply amount ΔS (%). For example, when the new-cartridge information indicates that the process cartridge P is new, the toner remaining amount Ta is 2%, the supplying time period t is 60 seconds and the assumed supply amount advances the processing to S504. In S504, the main control unit 401 resets and starts the timer, and measures a light receiving time period of the light receiving element 62 during one rotation of the developer conveyance member 17 by means of the toner remaining amount detection unit 414. In S505, the main control unit 401 determines whether or not measurement of the light receiving time period has ended. If the main control unit 401 determines in S505 that measurement of the light receiving time period has not ended, the main control unit 401 returns the processing to S504, while if it is determined that measurement of the light receiving time period has ended, the main control unit 401 advances the processing to S506. The main control unit 401 determines the end of measurement in accordance with rotation of the developer conveyance member 17 for a prescribed number of times. For example, the time required for the developer conveyance member 17 to make one rotation is taken as one second, and measurement is ended after five rotations were measured (that is, after five seconds have elapsed).

In S506, the main control unit 401 determines a toner remaining amount Tb based on the light receiving time period measured in S504. The method for calculating the toner remaining amount Tb will now be described. The main control unit 401 averages the light receiving time periods that were measured in S504, and takes the averaged light receiving time period as $t_{ave}$. The main control unit 401 then determines the toner remaining amount Tb based on information in Table 2 that shows the relation between the light receiving time period $t_{ave}$ and the toner remaining amount.

TABLE 2

| Light Receiving Time Period $t_{ave}$ (secs) | Toner Remaining Amount (%) |
|---|---|
| 0.0 | 100 |
| <0.1 | 100 |
| 0.1 | 10 |
| 0.15 | 9 |
| 0.2 | 8 |
| 0.25 | 7 |
| 0.3 | 6 |
| 0.4 | 5 |
| 0.5 | 4 |
| 0.6 | 3 |
| 0.7 | 2 |
| 0.8 | 1 |
| 0.9 | 0 |

The first column in Table 2 shows values of the averaged light receiving time period $t_{ave}$ (seconds). The second column in Table 2 shows toner remaining amounts (%). For example, in a case where the light receiving time period $t_{ave}$ during one second in which the developer container unit 16a rotates is 0.0 seconds or more and less than 0.1 seconds, the toner remaining amount is 100%. This means that, in a case where the light receiving time period $t_{ave}$ is $0.0 \leq t_{ave} < 0.1$, there was almost no time period during which light emitted from the light emitting element 61 could be received by the light receiving element 62, and therefore the remaining amount of toner is 100%. The same viewpoint applies with respect to the other rows also.

A time period in which the toner tn is not interposed on the optical path S is utilized as a common characteristic of toner remaining amount detection systems that utilize the light emitting element 61. Consequently, in regions in which the amount of toner tn inside the process cartridge P is large (regions where the toner remaining amount is from 100% to 11% in the present embodiment), the value for all of the light receiving time periods $t_{ave}$ is 0, and the toner remaining amounts cannot be distinguished. Therefore, after the toner remaining amount of 100%, the next toner remaining amount is 10%. In this case, when an error range of measurement results for the toner remaining amount Tb in Embodiment 1 is taken as −2% to +2%, and the upper limit value of the error is represented as a measurement error ΔT, the value of ΔT is 2%. In Embodiment 1, the error range is taken as being from −a % to +a %, and an upper limit value +a % is taken as a measurement error ΔT (=+a %). The error range may also be taken as being from b % to a % (b≤0, a≥0), and the value for which the absolute value is largest may be taken as the measurement error ΔT. For example, in the case of an error range of −5% to +2%, the measurement error ΔT is 5%.

If the process cartridge P is in an out-of-toner state, normally the toner bottle T is replaced with a new toner bottle T by the user. However, the image forming apparatus A does not include a replacement detecting unit for detecting that the toner bottle T was replaced. Therefore, processing until determining the toner remaining amount Tb will be described for a case where the toner bottle T has been replaced with a new toner bottle T and for a case where the toner bottle T has not been replaced.

(Case Where Toner Bottle T was Replaced)

If the process cartridge P is in an out-of-toner state, the toner remaining amount Ta based on Table 1 is 0%, and the assumed supply amount ΔS based on Table 1 is 80%. When the toner bottle T has been replaced with a new toner bottle T, in the processing in S502 the toner to is supplied as expected into the process cartridge P (the developer container unit 16a) from the new toner bottle T. In the processing in S504, measurement of the toner remaining amount is performed, and during a period in which the actual toner remaining amount is from 100% to 11%, the toner remaining amount Tb based on the light receiving time period $t_{ave}$ (seconds) as taken from Table 2 will be 100%. Thus, in a case where the toner bottle T was replaced, the toner remaining amount Ta when the process cartridge P is in the out-of-toner state is 0%, and the toner remaining amount Tb that is determined based on the measurement is 100%.

(Case Where Toner Bottle T was Not Replaced)

In a case where the process cartridge P is in an out-of-toner state and the toner bottle T is not replaced with a new toner bottle T, the toner remaining amount for the toner bottle T is normally 0%. In the processing in S502, because a supplying operation with respect to the process cartridge P is performed from the empty toner bottle T, the actual toner remaining amount in the process cartridge P is 0%. As a result of the measurement in the processing in S504, when also taking into consideration the measurement error ΔT, the toner remaining amount Tb has a range of 0% (taken as 0% since 0%−2%<0) to 2% (=0%+2%). In a case where the toner remaining amount Tb is from 1% to 2% due to the measurement error ΔT, if the toner remaining amount continues to be determined as 1% to 2% in this way, printing will be continued even though the actual toner remaining amount is 0%. Consequently, the developing unit B will be used beyond the service life of the developing unit B. Thus, in a case where the toner bottle T has not been replaced, the toner remaining amount Ta when the process cartridge P is in an out-of-toner state is 0%, and the toner remaining amount Tb determined by measurement is 0% to 2% when taking the measurement error ΔT into consideration.

The description will now return to FIG. 5. In S507, the main control unit 401 determines whether or not a difference (Tb−Ta) between the toner remaining amount Tb determined in S506 and the toner remaining amount Ta used when determining the supplying time period t in S501 is greater than the measurement error ΔT. If the main control unit 401 determines in S507 that the difference between the toner remaining amount Tb and the toner remaining amount Ta is greater than the measurement error ΔT (Tb−Ta>ΔT), the main control unit 401 advances the processing to S509. If the main control unit 401 determines in S507 that the difference between the toner remaining amount Tb and the toner remaining amount Ta is equal to or less than the measurement error ΔT (equal to or less than the measurement error) (Tb−Ta≤ΔT), the main control unit 401 advances the processing to S508. In S508, the main control unit 401 determines a current toner remaining amount Tn as the toner remaining amount Ta by means of the toner remaining amount determination unit 404, and ends the processing. In S509, the main control unit 401, the main control unit 401 determines the current toner remaining amount Tn as the toner remaining amount Tb by means of the toner remaining amount determination unit 404, and ends the processing. The main control unit 401 writes the toner remaining amount Tn that was determined in S508 or S509 into the memory unit 410 of the process cartridge 407 to update the toner remaining amount Ta.

[Case Where Toner Bottle T was Replaced]

A toner remaining amount is determined in each of the foregoing two cases. In a case where the toner bottle T was replaced with a new toner bottle T, the toner remaining amount Ta of the process cartridge P before the supplying operation is 0%, the toner remaining amount Tb determined based on the measurement result of the light receiving time period $t_{ave\ is}$ 100%, and ΔT is 2%. Therefore, the expression Tb−Ta (=100% (=100%−0%))>ΔT (=2%) holds. In the processing in S509, the main control unit 401 adopts the current toner remaining amount Tn as the toner remaining amount Tb. Accordingly, the toner remaining amount Tn becomes 100%, which is consistent with the actual toner remaining amount in the process cartridge P.

[Case Where Toner Bottle T was Not Replaced]

In a case where the toner bottle T was not replaced with a new toner bottle T, the toner remaining amount Ta of the process cartridge P before the supplying operation is 0%, the toner remaining amount Tb determined based on the measurement result of the light receiving time period $t_{ave}$ is 0% to 2%, and ΔT is 2%. Therefore, the expression Tb−Ta>ΔT does not hold for any value of the measurement error within the error range. In the processing in S508, the main control unit 401 adopts the current toner remaining amount T as the toner remaining amount Ta. Accordingly, the toner remaining amount Tn becomes 0%, which is consistent with the actual toner remaining amount in the process cartridge P.

As described above, in both a case where the toner bottle T was replaced with a new toner bottle T and a case where the toner bottle T was not replaced, the toner remaining amount can be correctly determined in a manner that takes the measurement error ΔT into consideration. When performing a toner remaining amount detection operation at the time of an initial operation, in a case where the toner bottle T is not replaced and there is no change in the toner remaining amount, the toner remaining amount is not determined so as to have increased due to a measurement error. The various parameters in the method for measuring the toner remaining amount and the method for calculating the toner remaining amount Tb of the present embodiment are examples. Therefore, any method may be adopted as long as the method can determine the toner remaining amount T based on the toner remaining amount Ta stored in the memory unit 410, the toner remaining amount Tb measured by the toner remaining amount detection unit 414, and the measurement error ΔT. As described above, according to the present embodiment even when measuring the toner remaining amount during an initial operation, the remaining amount of toner can be accurately measured.

[Embodiment 2]

[Toner Supplying Operation and Toner Measurement Operation During Initial Operation]

Figure 6:
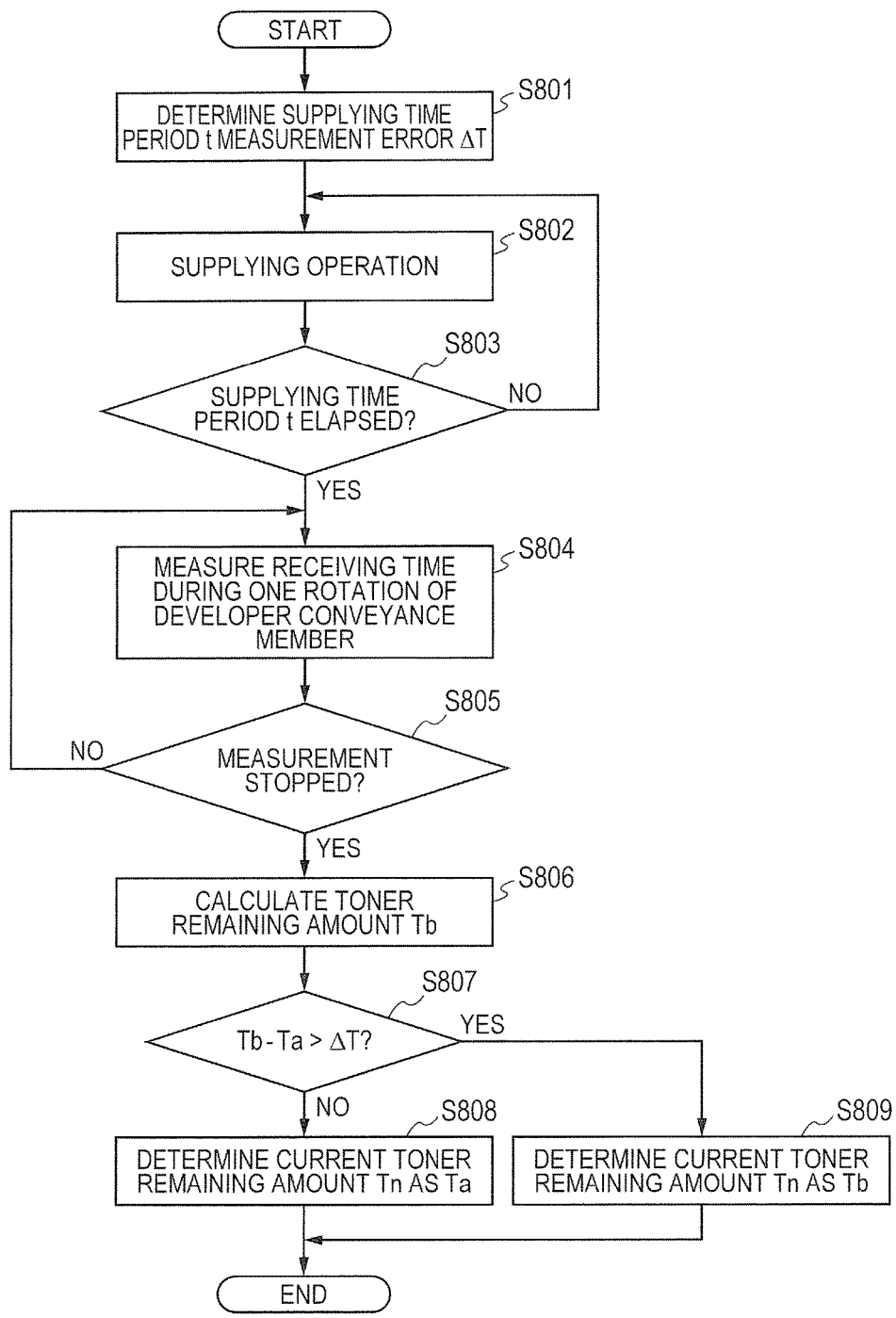
FIG. 6 is a flowchart illustrating a supplying operation and a measurement operation to measure the toner remaining amount according to Embodiment 2.

FIG. 6 is a flowchart illustrating processing for determining the toner remaining amount in the process cartridge P during an initial operation in Embodiment 2. As one example, a toner supplying operation and toner remaining amount detection during an initial operation in a case where the process cartridge P is in a new state are described.

Similarly to Embodiment 1, the image forming apparatus A of Embodiment 2 does not have a replacement detecting unit for detecting replacement of the toner bottle T, and does not have a unit for switching between whether or not to execute a supplying operation to supply the toner tn. However, regardless of whether the image forming apparatus A has or does not have a replacement detecting unit or a unit for switching between whether or not to execute a supplying operation, the toner remaining amount can be determined by the determination processing illustrated in FIG. 6.

Upon starting an initial operation when a door (not illustrated) of the image forming apparatus A is closed, the main control unit 401 starts the processing from S801 onward that is illustrated in FIG. 6. In S801, because the image forming apparatus A does not have a replacement detecting unit for detecting replacement of the toner bottle T, the main control unit 401 reads out the toner remaining amount Ta of the process cartridge P before the supplying operation or new-cartridge information regarding the process cartridge P from the memory unit 410 of the process cartridge P. The main control unit 401 determines the supplying time period t required for the supplying operation to supply the toner tn and the measurement error ΔT in accordance with the information that was read out. The relation between the state of the process cartridge P, the new-cartridge information, the toner remaining amount Ta, the supplying time period t and the assumed supply amount ΔS is the same as in Table 1 that is described in Embodiment 1, and hence a description thereof is omitted here. For example, when the process cartridge P is in a new state, based on Table 1, the toner remaining amount Ta is 2%, the supplying time period t is 60 seconds and the assumed supply amount ΔS is 90%.

The relation between the light receiving time period $t_{ave}$, the toner remaining amount (%) and the measurement error ΔT (%) will now be described using Table 3.

TABLE 3

| Light Receiving Time Period $t_{ave}$ (secs) | Toner Remaining Amount (%) | Measurement Error ΔT (%) |
|---|---|---|
| 0.0 | 100 | 0 |
| <0.1 | 100 | 0 |
| 0.1 | 10 | 2 |
| 0.15 | 9 | 2 |
| 0.2 | 8 | 2 |
| 0.25 | 7 | 2 |
| 0.3 | 6 | 1 |
| 0.4 | 5 | 1 |
| 0.5 | 4 | 1 |
| 0.6 | 3 | 1 |
| 0.7 | 2 | 1 |
| 0.8 | 1 | 1 |
| 0.9 | 0 | 1 |

The relation between the light receiving time period $t_{ave}$ and the toner remaining amount is the same as in Table 2, and hence a description thereof is omitted here. Since the relation between the light receiving time period $t_{ave}$ and the toner remaining amount utilizes a time period for which the toner tn is not interposed on the optical path 5, as the remaining amount of the toner tn decreases, the light receiving time period increases and the measurement error ΔT decreases. Consequently, in Embodiment 2, the measurement error ΔT is also set in accordance with the light receiving time period. One example of the foregoing relation is shown in Table 3. The upper limit value in the measurement error range is described as the measurement error ΔT in Table 3. For example, if the measurement error ΔT is a %, the measurement error range is −a % to +a %. The measurement error ΔT is determined in accordance with the amount of the toner tn measured by the toner remaining amount detection unit 414.

In S802, for the duration of the supplying time period t (for example, 60 seconds) determined in S801, the main control unit 401 drives the motor 506 to perform a supplying operation to supply the toner tn by means of the toner supplying mechanism 412. In S803, the main control unit 401 ends the supplying operation when the supplying time period t (for example, 60 seconds) elapses. The processing in S804 and S805 is the same as the processing in S504 and S505 in FIG. 5 in Embodiment 1, and hence a description thereof is omitted here.

In S806, the main control unit 401 determines the toner remaining amount Tb. Since a case where the toner bottle T is replaced with a new toner bottle T was described in Embodiment 1, in Embodiment 2 a case will be described in which the process cartridge P is replaced and the toner bottle T is used as it is without being replaced. With respect to the toner bottle T, a case where some of the toner tn still remains (the toner remaining amount is taken as 7%) and a case where none of the toner tn remains (the toner remaining amount is taken as 0%) will be described.

(Case Where Actual Toner Remaining Amount is 7%)

In a case where the process cartridge P was replaced with a new process cartridge P, based on Table 1 the toner remaining amount Ta is 2% and the assumed supply amount ΔS is 90%. However, the amount of the toner tn remaining in the toner bottle T is only 7%. Even if all of the toner tn is supplied from the toner bottle T, the toner remaining amount of the process cartridge P only becomes a total of 9% that is obtained by adding the supplied amount of 7% to the toner remaining amount Ta of 2% of the process cartridge P before supplying the toner tn. The main control unit 401 refers to Table 3 and adopts the value of 2% as the measurement error ΔT that corresponds to the toner remaining amount of 9%. The range of the measurement error ΔT is −2% to 2%, and the toner remaining amount Tb is from 7% (=9%−2%) to 11% (=9%+2%). Thus, in a case where the actual toner remaining amount in the toner bottle T is 7%, the toner remaining amount Ta is 2% and the toner remaining amount Tb is 7% to 11%.

(Case Where Actual Toner Remaining Amount is 0%)

In a case where the process cartridge P was replaced with a new process cartridge P, based on Table 1 the toner remaining amount Ta is 2% and the assumed supply amount ΔS is 90%. However, since there is no toner tn (0%) in the toner bottle T, the toner to is not supplied even if a supplying operation is performed. The actual toner remaining amount in the process cartridge P remains 2% which is the toner remaining amount Ta. The main control unit 401 refers to Table 3 and adopts the value of 1% as the measurement error ΔT that corresponds to the toner remaining amount of 2%. The range of the measurement error ΔT is −1% to +1%, and the toner remaining amount Tb is therefore from 1% (=2%−1%) to 3% (=2%+1%). Thus, in a case where the actual toner remaining amount in the toner bottle T is 0%, the toner remaining amount Ta is 2% and the toner remaining amount Tb is 1% to 3%. If the toner remaining amount Tb is updated as the toner remaining amount Tn, there is a risk that even though the toner remaining amount has not changed, a different remaining amount will be notified to the user.

The description will now return to FIG. 6. The processing in S807 to S809 is the same as the processing in S507 and S509 in FIG. 5, and hence a description thereof is omitted here. However, in S807, the measurement error ΔT that is used for the determination is the measurement error ΔT that was determined in S801. Thus, respective toner remaining amounts Tn are determined for the above-described two cases.

(Case Where Actual Toner Remaining Amount is 7%)

In a case where the toner remaining amount in the toner bottle T is 7%, the toner remaining amount Ta of the process cartridge P before a supplying operation is 2%, the toner remaining amount Tb is 7% to 11%, and the measurement error ΔT is 2%. Therefore, the expression Tb−Ta>ΔT holds for any value of the measurement error within the error range. In the processing in S809, the main control unit 401 determines the current toner remaining amount Tn as the toner remaining amount Tb by means of the toner remaining amount determination unit 404. Accordingly, the toner remaining amount Tn in this case is from 7% to 11%.

(Case Where Actual Toner Remaining Amount is 0%)

In a case where the toner remaining amount in the toner bottle T is 0%, the toner remaining amount Ta is 2%, the toner remaining amount Tb is 1% to 3%, and the measurement error ΔT is 1%. Therefore, the expression Tb−Ta>ΔT does not hold for any value of the measurement error within the error range. In the processing in S808, the main control unit 401 determines the current toner remaining amount Tn as the toner remaining amount Ta by means of the toner remaining amount determination unit 404. Accordingly, the toner remaining amount Tn in this case is 2%, which is consistent with 2% that is the actual toner remaining amount in the process cartridge P.

As described above, the same advantageous effects as in Embodiment 1 can also be obtained in Embodiment 2. When the process cartridge P has been replaced with a new process cartridge P, in both a case where some of the toner tn remains in the toner bottle T and a case where the toner tn does not remain in the toner bottle T, the toner remaining amount can be correctly determined in a manner that takes the measurement error ΔT into consideration. The various parameters in the method for measuring the toner remaining amount and the method for calculating the toner remaining amount Tb of Embodiment 2 are examples, and hence any method may be adopted as long as the method can determine the toner remaining amount based on the toner remaining amounts Ta and Tb and the measurement error ΔT.

[Embodiment 3]

In Embodiments 1 and 2, the supplying time period t for the toner to is determined based on the new-cartridge information of the process cartridge P or the toner remaining amount Ta when starting an initial operation, and toner remaining amount detection is executed after the supplying operation ends. In Embodiment 3, a case is described in which a toner supplying operation and a toner measurement operation are executed concurrently with another initial operation to thereby shorten the time period for the initial operation. Hereinafter, a toner supplying operation and a toner measurement operation that are executed concurrently are referred to collectively as "toner remaining amount determination sequence". Further, unlike in Embodiments 1 and 2, the execution time for the toner remaining amount determination sequence is dynamically determined according to the initial operations that are to be concurrently executed. As illustrated in Table 4, the longer that the execution time of the toner remaining amount determination sequence is, the smaller the measurement error ΔT becomes because the number of samplings with respect to the light receiving time period increases.

TABLE 4

| Toner Remaining Amount Determination Sequence Execution Time d (secs) | Measurement Error ΔT (%) |
|---|---|
| 0 | 3 |
| 5 | 2 |
| 10 | 1 |
| 60 | 0 |

The first column in Table 4 shows an execution time d (seconds) of the toner remaining amount determination sequence. The second column in Table 4 shows the measurement error ΔT (%). As shown in Table 4, for example, the measurement error ΔT is taken as 3% when the execution time d of the toner remaining amount determination sequence is 0≤d<5. The measurement error ΔT is determined in accordance with the time period (execution time d) required for the initial operation.

[Toner Supplying Operation and Toner Measurement Operation During Initial Operation]

Figure 7:
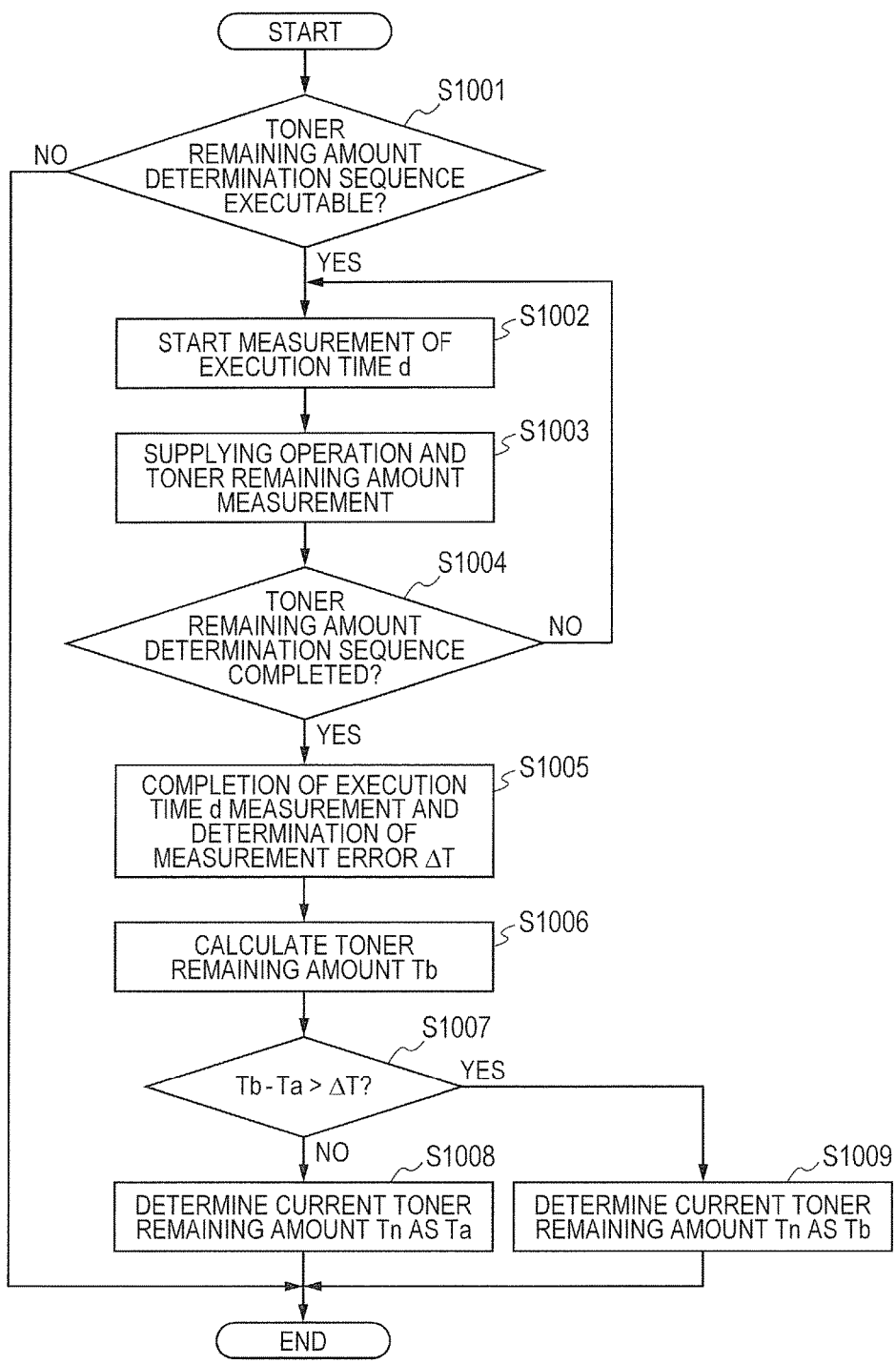
FIG. 7 is a flowchart illustrating processing to determine the toner remaining amount according to Embodiment 3.

FIG. 7 is a flowchart for describing the toner remaining amount determination sequence for the process cartridge P during an initial operation according to Embodiment 3. In Embodiment 3, similarly to Embodiments 1 and 2, the image forming apparatus A does not have a replacement detecting unit for detecting replacement of the toner bottle T and does not have a unit for switching between whether or not to execute a supplying operation to supply toner. However, regardless of whether the image forming apparatus A has or does not have a replacement detecting unit and a unit for switching between whether or not to execute a toner supplying operation, the toner remaining amount can be determined by the determination processing illustrated in FIG. 7.

Upon starting an initial operation after a door (not illustrated) of the image forming apparatus A is closed, the main control unit 401 starts the processing from S1001 onward that is illustrated in FIG. 7. In S1001, the main control unit 401 determines whether or not there is another initial operation to be concurrently executed, and it is possible to execute the toner remaining amount determination sequence. In S1001, if the main control unit 401 determines that it is not possible to execute the toner remaining amount determination sequence, the main control unit 401 ends the processing. In contrast, if the main control unit 401 determines in S1001 that it is possible to execute the toner remaining amount determination sequence, the main control unit 401 advances the processing to S1002. In S1002 the main control unit 401 resets and starts a timer (not illustrated) and starts to measure the time (execution time d) required for the toner remaining amount determination sequence. In S1003, the main control unit 401 performs the toner remaining amount determination sequence to concurrently perform a supplying operation and measurement of the toner remaining amount. In S1003, while a supplying operation is being performed by means of the toner supplying mechanism 412, measurement of the toner remaining amount is performed by the toner remaining amount detection unit 414. The supplying operation is performed for only the time period in which the other initial operation is being executed. Measurement of the toner remaining amount is performed by similar processing to the processing in S504 and S505 in FIG. 5 while the other initial operation is being executed.

In S1004, the main control unit 401 determines whether or not to end the toner remaining amount determination sequence in accordance with whether or not the other initial operation that is being concurrently executed has ended. In S1004, if the main control unit 401 determines that the other initial operation is continuing and therefore determines not to end the toner remaining amount determination sequence, the main control unit 401 returns the processing to S1002. In S1004, if the main control unit 401 determines that the other initial operation has ended and therefore determines to end the toner remaining amount determination sequence, the main control unit 401 advances the processing to S1005. In S1005, the main control unit 401 ends measurement of the time period of the toner remaining amount determination sequence. The time that the main control unit 401 measured is the execution time d of the toner remaining amount determination sequence. The main control unit 401 determines the measurement error ΔT based on the measured time, that is, the execution time d of the toner remaining amount determination sequence, and the information in Table 4. For example, in a case where the execution time d is 10 seconds, the main control unit 401 determines the measurement error ΔT as 1% based on Table 4.

In S1006, the main control unit 401 determines the toner remaining amount Tb based on the result of measurement of the toner remaining amount that was executed in S1003. In Embodiment 3, because a supplying operation and a toner remaining amount measurement are concurrently performed, the actual toner remaining amount changes while the toner remaining amount is being measured. When determining the toner remaining amount Tb, the toner remaining amount Tb may also be determined by utilizing a moving average or the like or assigning weights to measurement results. The processing in S1007 to S1009 is the same as the processing in S507 to S509 in FIG. 5, and a hence a description thereof is omitted here. However, the measurement error ΔT determined in S1005 is used as the measurement error ΔT that is used in the determination processing in S1007. Further, with respect to specific calculation of the toner remaining amount also, the calculation is the same in a case where the state of the process cartridge P is a different state, as in the description for a case where the process cartridge P is a new process cartridge or is in an out-of-toner state.

As described above, in order to shorten the time required for an initial operation, a supplying operation and measurement of the toner remaining amount are performed concurrently with another initial operation. Even in such a case, as long as the toner remaining amounts Ta and Tb and the measurement error ΔT can be determined, the toner remaining amount can be correctly determined in a manner that takes into consideration the measurement error ΔT, regardless of the remaining amount in the toner bottle T. The method for measuring the toner remaining amount, the method for calculating the toner remaining amount Tb and the various parameters in Embodiment 3 are examples, and hence any methods may be adopted as long as the methods can determine a toner remaining amount based on the toner remaining amounts Ta and Tb and the measurement error ΔT. As described above, similar advantageous effects as in Embodiment 1 are obtained in Embodiment 3 also.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-141516, filed Jul. 19, 2016, which is hereby incorporated by reference herein in its entirety.

What is claimed is:

1. An image forming apparatus comprising:
   an image bearing member;
   a developing unit configured to develop an electrostatic latent image formed on the image bearing member, with toner;
   a toner container in which toner for supplying to the developing unit is contained, the toner container detachably provided in the image forming apparatus;
   a measuring unit configured to measure information relating to an amount of toner in the developing unit; and
   a determination unit configured to determine an amount of toner in the developing unit based on the information relating to the amount of toner measured by the measuring unit,
   wherein in a case where the information measured by the measuring unit reaches a predetermined value as the toner in the developing unit is consumed, a supply operation for supplying toner from the toner container to the developing unit is performed and the measuring unit measures the information relating to an amount of toner in the developing unit after the supply operation is performed, and in a case where the information relating to an amount of toner in the developing unit measured after the supply operation is performed is within a range of a measurement error corresponding to the predetermined value, the determination unit determines that the amount of the toner in the developing unit is an amount corresponding to the predetermined value,
   wherein a value of the measurement error in a case of a first amount of toner remaining in the developing unit is smaller than a value of the measurement error in a case of a second amount of toner remaining in the developing unit less than the first amount.

2. The image forming apparatus according to claim 1,
   further comprising a memory unit configured to store information relating to a usage state of the developing unit;
   wherein the information relating to a usage state of the developing unit is information indicating an amount of toner in the developing unit, the amount of toner determined by the determination unit.

3. The image forming apparatus according to claim 2,
   wherein in a case where a difference between an amount of toner that is measured by the measuring unit and an amount of toner that is stored in the memory unit is greater than the value of the measurement error within the range of the measurement error, the determination unit determines the amount of toner that is measured by the measuring unit as being the amount of toner in the developing unit, and in a case where the difference is equal to or less than the measurement error, the determination unit determines the amount of toner that is stored in the memory unit as being the amount of toner in the developing unit.

4. The image forming apparatus according to claim 1,
   further comprising a supplying unit configured to supply toner from the toner container to the developing unit,
   wherein after supplying of toner from the toner container to the developing unit is performed by the supplying unit for a predetermined time period, the measuring unit measures the amount of toner in the developing unit.

5. The image forming apparatus according to claim 4,
   wherein the information stored in the memory unit includes information indicating a state of the toner container; and the predetermined time period is determined based on the information indicating the state of the toner container that is stored in the memory unit.

6. The image forming apparatus according to claim 1,
   further comprising:
   a supplying unit configured to supply toner from the toner container to the developing unit,
   wherein a supplying operation to supply toner from the toner container by the supplying unit and a measurement operation by the measuring unit are executed concurrently with an initial operation before performing an image forming operation.

7. The image forming apparatus according to claim 6,
   wherein the measurement error is determined in accordance with a time period required for the initial operation.

8. The image forming apparatus according to claim 1,
   further comprising:
   an agitation member configured to agitate toner in the developing unit by rotation;
   wherein the measuring unit has a light emitting element and a light receiving element, and measures an amount of the toner based on a time period in which the light receiving element receives light emitted from the light emitting element during one rotation of the agitation member.

9. The image forming apparatus according to claim 8,
   wherein the shorter that the time period in which the light receiving element receives light is, the larger the amount that the measuring unit measures the amount of toner as being.

10. The image forming apparatus according to claim 1,
    wherein the predetermined value is a value to indicate that a percentage of the amount of the toner in the toner container to a volume of the toner container is 0%.

11. The image forming apparatus according to claim 1,
    wherein a state in which the determination unit determines that the amount of the toner in the developing unit is an amount corresponding to the predetermined value is a state in which the toner container is not replaced with a new toner container.

12. The image forming apparatus according to claim 1,
    wherein in a case where the information measured by the measuring unit is out of a predetermined measurement error range, the determination unit determines that the amount of the toner in the toner container is more than the amount corresponding to the predetermined value.

13. The image forming apparatus according to claim 12,
    wherein a state in which the determination unit determines that the amount of the toner in the toner container is more than an amount corresponding to the predetermined value is a state in which the toner container is replaced with a new toner container.

14. The image forming apparatus according to claim 1,
    wherein the measuring unit is configured to measure information regarding a toner amount of the developing unit, independently of a toner amount in the toner container, and
    the determination unit is configured to determine whether or not a value corresponding to the information measured by the measuring unit is within the range of the measurement error.

15. The image forming apparatus according to claim 1,
    wherein the developing unit is detachably mounted on the image forming apparatus, and
    wherein in a case where the developing unit is replaced with a new developing unit, the supply operation for supplying toner from the toner container to the new developing unit is performed during a predetermined time period.

\* \* \* \* \*